United States Patent
Hirasawa et al.

(10) Patent No.: US 11,603,109 B2
(45) Date of Patent: Mar. 14, 2023

(54) VEHICLE

(71) Applicant: Toyota Jidosha Kabushiki Kaisha, Toyota (JP)

(72) Inventors: Takahiko Hirasawa, Toyota (JP); Tomoko Oba, Nagoya (JP); Takaharu Hori, Anjo (JP); Kenji Uchida, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 16/869,087

(22) Filed: May 7, 2020

(65) Prior Publication Data

US 2020/0361479 A1 Nov. 19, 2020

(30) Foreign Application Priority Data

May 14, 2019 (JP) .............................. JP2019-091132

(51) Int. Cl.
*B60W 50/02* (2012.01)
*B60W 50/14* (2020.01)
*B60W 60/00* (2020.01)
*B60W 50/029* (2012.01)

(52) U.S. Cl.
CPC ...... *B60W 50/0205* (2013.01); *B60W 50/029* (2013.01); *B60W 50/14* (2013.01); *B60W 60/0016* (2020.02); *B60W 60/00253* (2020.02); *B60W 2050/0215* (2013.01); *B60W 2050/143* (2013.01); *B60W 2540/049* (2020.02)

(58) Field of Classification Search
CPC ........... B60W 50/0205; B60W 50/029; B60W 50/14; B60W 60/0016; B60W 60/00253; B60W 2050/0215; B60W 2050/143; B60W 2540/049; B60W 2050/146; G07C 5/006; G07C 5/0808; G07C 5/0816; B60R 16/0234; B60Q 9/00; B60K 35/00
See application file for complete search history.

(56) References Cited

U.S. PATENT DOCUMENTS

| 2014/0309913 A1* | 10/2014 | Ricci | G06Q 20/321 |
| | | | 701/117 |
| 2017/0210353 A1* | 7/2017 | Stauffer | B60N 2/58 |
| 2018/0321678 A1* | 11/2018 | Valeri | B60W 10/04 |
| 2020/0111272 A1* | 4/2020 | Ferre Fabregas | G05B 23/0283 |
| 2020/0383580 A1* | 12/2020 | Shouldice | A61B 5/1102 |

FOREIGN PATENT DOCUMENTS

JP H10104002 A 4/1998

* cited by examiner

*Primary Examiner* — Jeff A Burke
*Assistant Examiner* — Sihar A Karwan
(74) *Attorney, Agent, or Firm* — Dinsmore & Shohl LLP

(57) ABSTRACT

A vehicle includes: an instrument panel that displays an alarm to a driver; and an ECU that controls the instrument panel based on a setting as to whether the driver is to perform maintenance of the vehicle or not. In a first setting in which the driver is to perform maintenance, the ECU controls the instrument panel to display an alarm when a failure occurs in an on-vehicle device. In a second setting in which the driver is not to perform maintenance, the ECU controls the instrument panel not to display an alarm about a failure less influencing traveling.

12 Claims, 5 Drawing Sheets

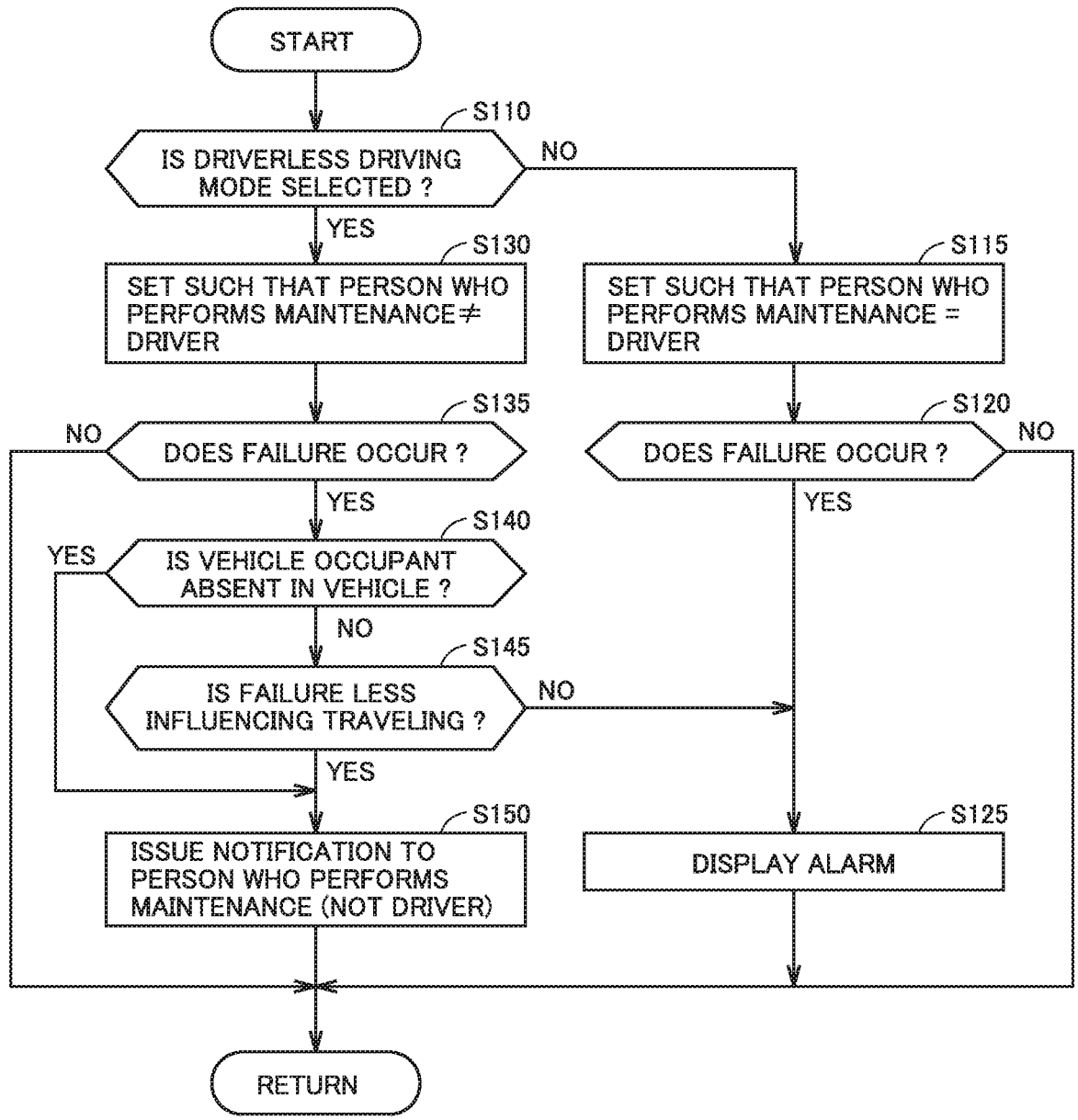

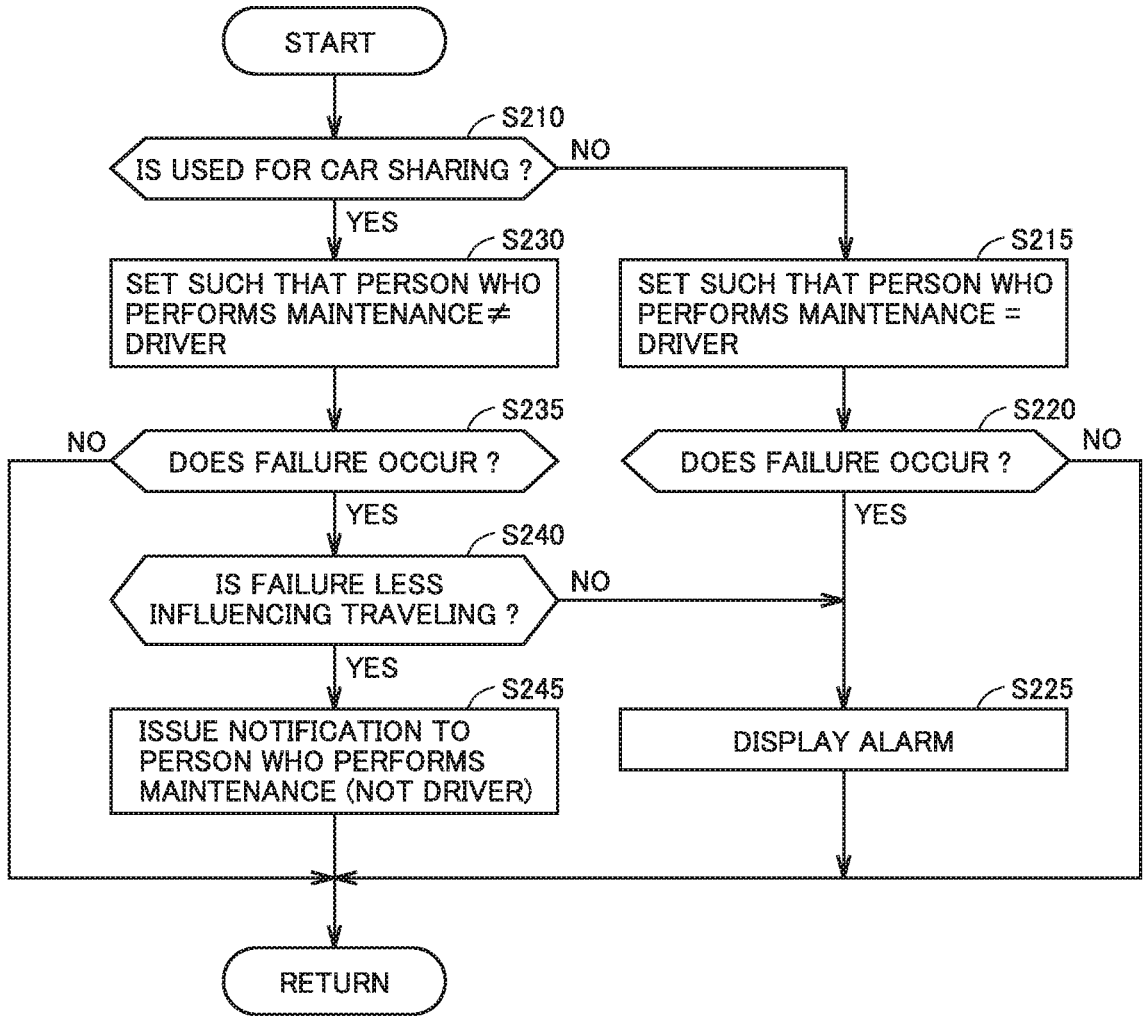

VEHICLE

CROSS REFERENCE TO RELATED APPLICATIONS

This nonprovisional application claims priority to Japanese Patent Application No. 2019-091132 filed on May 14, 2019 with the Japan Patent Office, the entire contents of which are hereby incorporated by reference.

BACKGROUND

Field

The present disclosure relates to a vehicle, and particularly to a vehicle including a notification device configured to issue a notification of an alarm to a driver.

Description of the Background Art

Japanese Patent Laying-Open No. 10-104002 discloses a navigation device capable of accurately providing required information without providing excessive information in accordance with the traveling state of a vehicle. In this navigation device, when there are a plurality of pieces of information to be provided to a driver at the same time, provision of the information is differently restricted in accordance with the vehicle traveling state. For example, when the vehicle is in a quick brake state, only the urgent information (accident information and the like) with a priority having a rank value of A or more is provided, but provision of non-urgent information (a title of a music program, and the like) is restricted.

Generally, a driver performs maintenance of a vehicle, but there may be a case where a driver is not to perform maintenance. For example, in the case of vehicles for car sharing, vehicles for driverless driving (automated driving) and the like, maintenance of such vehicles may be performed not by drivers but by car sharing operators, dealers, and the like. Also in such a case, when the vehicle's user is notified of an alarm about each failure occurring in an on-vehicle device, the user may feel annoyance at such an alarm.

SUMMARY

The present disclosure has been made to solve the above-described problems. An object of the present disclosure is to reduce annoyance that a user feels due to an alarm notification issued to the user when a failure occurs in an on-vehicle device.

A vehicle of the present disclosure includes: a notification device that notifies a driver about an alarm; and a controller that controls the notification device based on a setting as to whether the driver is to perform maintenance of the vehicle or not. In a first setting in which the driver is to perform the maintenance, the controller controls the notification device to issue a notification of an alarm when a failure occurs in an on-vehicle device. The controller further determines whether the failure in the on-vehicle device is a first failure significantly influencing traveling of the vehicle or a second failure less influencing traveling of the vehicle than the first failure. In a second setting in which the driver is not to perform the maintenance, the controller controls the notification device not to issue a notification of an alarm about the second failure.

According to the present vehicle, when the driver is not to perform maintenance, no notification of an alarm about the failure less influencing traveling (the second failure) is issued. Therefore, the annoyance can be reduced that the driver feels when the driver is notified of such an alarm.

In the second setting, the controller may control the notification device to issue a notification of an alarm when the first failure occurs.

Thereby, when the failure significantly influencing traveling (the first failure) occurs, the driver can take appropriate measures, for example, by contacting a dealer.

The vehicle may further include an input device that is capable of setting whether the driver is to perform the maintenance or not.

According to the present vehicle, through the input device, a user can set whether the driver is to perform maintenance or not. When the user perform setting such that the driver is not to perform maintenance, a notification of an alarm about the failure less influencing traveling (the second failure) is not issued. Therefore, the present vehicle can reduce the annoyance that the user feels when the user is notified of an alarm.

The controller may obtain, from outside the vehicle, the setting as to whether the driver is to perform maintenance of the vehicle or not.

According to the present vehicle, the user in the vehicle does not need to set whether the driver is to perform maintenance or not. Therefore, according to the present vehicle, the user's convenience is improved.

The vehicle may be capable of performing driverless driving. During the driverless driving, the controller may select the second setting as the setting as to whether the driver is to perform maintenance of the vehicle or not.

The above-described configuration can reduce the annoyance that the user feels when the user is notified of an alarm about a failure less influencing traveling (the second failure) despite during driverless driving.

The controller may further control the notification device not to issue a notification of an alarm about the first failure when a vehicle occupant is not in the vehicle during the driverless driving.

Thereby, a notification of an alarm is not unnecessarily issued inside the vehicle when a vehicle occupant is not in the vehicle during driverless driving.

When the vehicle is used for car sharing, the controller may select the second setting as the setting as to whether the driver is to perform maintenance of the vehicle or not.

When the vehicle is used for car sharing, it is considered that the person who performs maintenance of the vehicle is a car sharing operator, and the driver is not to perform maintenance. In such a case, the annoyance can be reduced that the driver feels due to a notification of an alarm about the failure less influencing traveling (the second failure).

The vehicle may further include a communication device that communicates with outside the vehicle. The communication device may transmit a notification to a person who performs the maintenance when the setting as to whether the driver is to perform maintenance of the vehicle or not is the second setting and when the second failure occurs.

According to the above-described configuration, the person who performs maintenance and who is not in the vehicle can recognize occurrence of the second failure, and therefore, can take appropriate measures.

The second failure may include a failure that deteriorates fuel efficiency while the vehicle is capable of traveling. Alternatively, the second failure may include a failure that deteriorates noise vibration (NV) characteristics of the vehicle while the vehicle is capable of traveling. Alternatively, the second failure may include a fail ore in an interlock system. Alternatively, when the vehicle further includes: a motor mounted as a power source; and a sensor that detects a temperature of the motor, the second failure may include a failure in the sensor. Alternatively, the second failure may include a failure showing a reduction in an insulation resistance in one of electrical systems of the vehicle. Alternatively, the second failure may include a failure in an air-bag system.

Since these failures are determined as less influencing traveling, the driver who is not to perform maintenance is not notified of alarms about these failures. Therefore, the annoyance can be reduced that the user feels due to notification of an alarm issued to the user when a failure less influencing traveling (the second failure) occurs.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a flowchart illustrating an example of the process for an alarm notification executed by the ECU in the first modification.

FIG. 5 is a flowchart illustrating an example of the process for an alarm notification executed by the ECU in the second modification.

DETAILED DESCRIPTION

Figure 1:
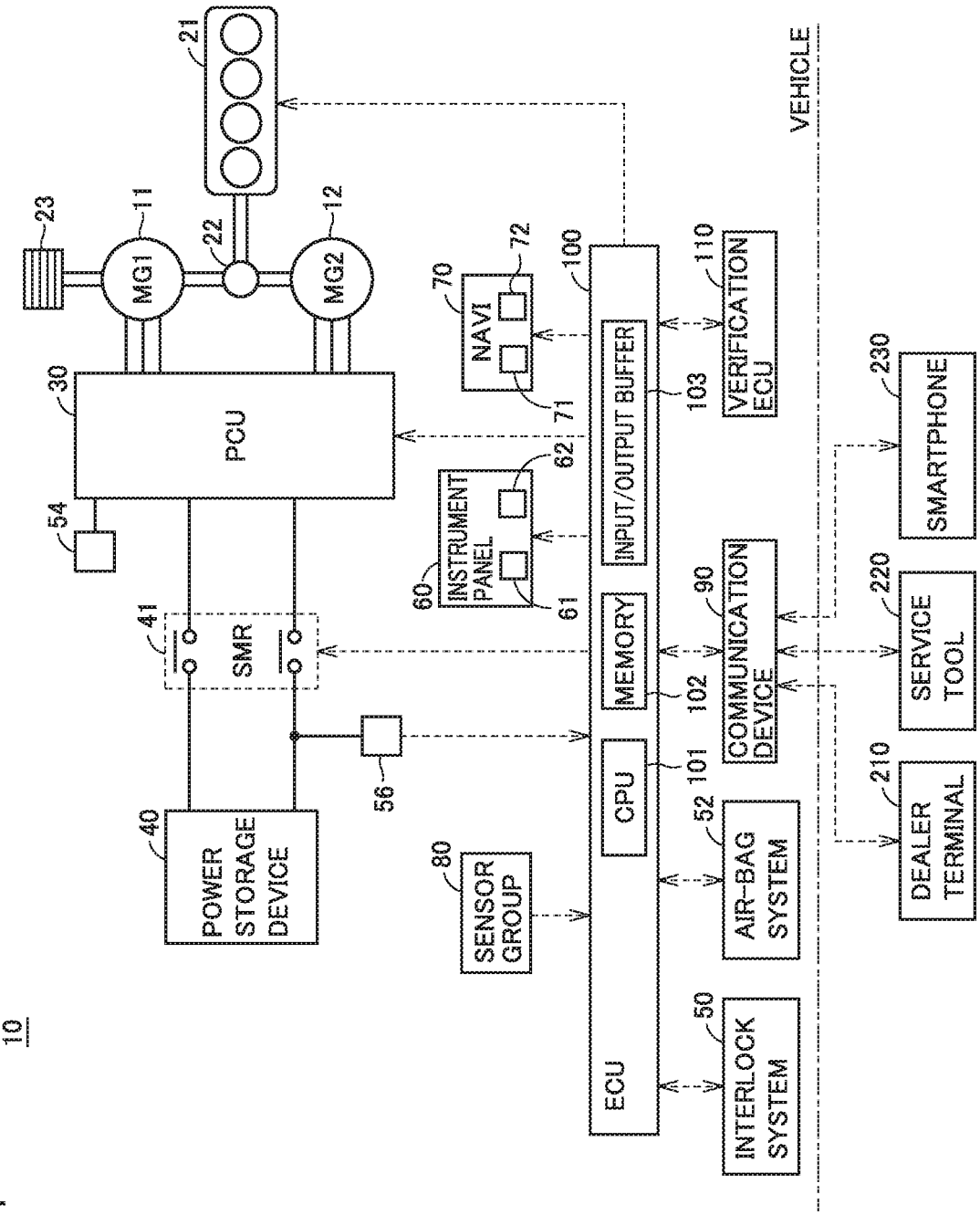
FIG. 1 is an entire configuration diagram of a vehicle according to an embodiment of the present disclosure.

Embodiments of the present disclosure Till be hereinafter described in detail with reference to the accompanying drawings, in which the same or corresponding components will be designated by the same reference characters, and the description thereof will not be repeated.

FIG. 1 is an entire configuration diagram of a vehicle according to an embodiment of the present disclosure. In the following, a hybrid vehicle including an engine and a motor generator as a power source will be representatively described, but the vehicle according to the present disclosure is not necessarily limited to a hybrid vehicle, and may be an electric vehicle not including an engine or may be a vehicle including only an engine as a power source.

Referring to FIG. 1, vehicle 10 includes a first motor generator (hereinafter referred to as a "first MG") 11, a second MG 12, an engine 21, a power split device 22, a driving wheel 23, a power control unit (PCU) 30, a power storage device 40, and a system main relay (SMR) 41.

Each of first MG 11 and second MG 12 is a motor generator driven by PCU 30 and, for example, is a three-phase alternating-current (AC) synchronous motor having a rotor in which a permanent magnet is incorporated. First MG 11 is coupled to a crankshaft of engine 21 through power split device 22 and rotates the crankshaft of engine 21 when engine 21 is started. Furthermore, first MG 11 can also generate electric power using the power from engine 21. The electric power generated by first MG 11 is rectified by PCU 30 and stored in power storage device 40. The electric power generated by first MG 11 may be supplied to second MG 12.

Second MG 12 rotates the drive shaft using at least one of the electric power from power storage device 40 and the electric power generated by first MG 11. Second MG 12 can also perform regenerative power generation during braking of the vehicle. The electric power generated by second MG 12 is rectified by PCU 30 and stored in power storage device 40.

Engine 21 is an internal combustion engine such as a gasoline engine and a diesel engine, and generates traveling drive force for vehicle 10 according to a control signal from ECU 100. Power split device 22 is a planetary gear mechanism, for example, and serves to split the power generated by engine 21 into power that is to be transmitted to driving wheel 23 and power that is to be transmitted to first MG 11.

According to the control signal from ECU 100, PCU 30 converts the electric power stored in power storage device 40 into AC power, and supplies the converted AC power to first MG 11 and second MG 12. Furthermore, PCU 30 rectifies the AC power generated by first MG 11 and second MG 12, and supplies the rectified AC power to power storage device 40. PCU 30 is configured to include, for example, an inverter that drives first MG 11, an inverter that drives second MG 12, and a converter that performs voltage conversion between power storage device 40 and each of first MG 11 and second MG 12.

Power storage device 40 is an electric power storage element configured to be rechargeable. Power storage device 40 is configured to include, for example, a secondary battery such as a lithium-ion battery or a nickel-metal hydride battery, or a power storage element such as an electric double layer capacitor. It should be noted that the lithium-ion secondary battery is a secondary battery containing lithium as a charge carrier, and may also include a common lithium ion secondary battery including a liquid electrolyte, or a so-called all-solid-state battery including a solid electrolyte.

Power storage device 40 can receive the electric power generated by first MG 11 through PCU 30 and store the received electric power therein. Power storage device 40 can also supply the electric power stored therein to second MG 12 through PCU 30. Furthermore, power storage device 40 can also receive, through PCU 30, the electric power generated by second MG 12 during deceleration and the like of the vehicle and can store the received electric power therein. Power storage device 40 can also supply the electric power stored therein to first MG 11 through PCU 30 at the start of engine 21, and the like.

SMR 41 is provided between PCU 30 and power storage device 40. According to the control signal from ECU 100, SMR 41 switches supply and reception of electric power between PCU 30 and power storage device 40 to be started and stopped.

Vehicle 10 further includes an interlock system 50, an air-bag system 52, a cooling system 54, an insulation resistance reduction detector 56, an instrument panel. 60, a navigation device 70, a sensor group 80, a communication device 90, an electronic control unit (ECU) 100, and a verification ECU 110.

Interlock system 50 serves to ensure the safety against a high voltage during maintenance of high voltage equipment such as PCU 30 and power storage device 40. Interlock system 50 is configured to include, for example, an interlock switch and the like that are turned on in the state where the cover of the high voltage equipment is removed. Interlock system 50 stops the operation of the system of the vehicle (power supply shut-down), for example, when an operator removes the cover of the high voltage equipment in the state Where the system of vehicle 10 is started (in the Ready-ON state).

Air-bag system 52 serves to operate an air bag provided in each seat. Air-bag system 52 is configured to include, for example, an air bag provided in each seat, a seat belt pretensioner, an air-bag sensor, an acceleration sensor, an air-bag computer, and the like.

Cooling system 54 serves to cooling PCU 30. For example, cooling system 54 is configured to include: a water pump for circulating cooling water for cooling an inverter, a converter and the like included in PCU 30; a radiator; and the like. Based on the temperature of PCU 30, the water pump is variably controlled in two stages of high driving and low driving. By variably controlling the water pump based on the temperature of PCU 30, power consumption is appropriately adjusted so as to improve the fuel efficiency.

Insulation resistance reduction detector 56 serves to detect an insulation abnormality in the high voltage electrical system (including power storage device 40, PCU 30, first MG 11, and second MG 12) in vehicle 10. Insulation resistance reduction detector 56 is, for example, electrically connected to the negative electrode of power storage device 40 and detects a reduction in insulation resistance of the high voltage electrical system based on the voltage detected when a voltage is applied to the high voltage electrical system.

Maintenance is required in the case of occurrence of failures such as: a reduction in insulation resistance in interlock system 50, air-bag system 52, cooling system 54, or one of the high voltage electrical systems as described above; and failures in the temperature sensor of first MG 11 or second MG 12, or a knock sensor (the temperature sensor and the knock sensor will be described later in detail) in sensor group 80. However, the failures as described above exert no or only a slight influence on traveling of vehicle 10. Each of such failures will be hereinafter referred to as a "failure less influencing traveling".

On the other hand, traveling of vehicle 10 is significantly influenced, for example, by failures such as an abnormality in an engine spark plug (not shown), an overcurrent abnormality in first MG 11 or second MG 12, a short circuit fault in the cell in power storage device 40, insulation resistance reduction in a plurality of high voltage electrical systems. Each of such failures will be hereinafter referred to as a "failure significantly influencing traveling". The influence exerted on traveling by the "failure less influencing traveling" is smaller than the influence exerted on traveling by the "failure significantly influencing traveling".

Instrument panel 60 is a notification device provided with various meters, alarming devices and the like. According to the control by ECU 100, instrument panel 60 displays various states of vehicle 10 to a driver. Instrument panel 60 is configured to include an input port 61 through which various pieces of information is received, and a display 62 on which various pieces of information is shown.

Instrument panel 60 is configured to be capable of displaying a vehicle speed, a remaining amount of energy (fuel amount and stored power amount) and the like, and also, capable of displaying, to the driver, an alarm corresponding to a failure that occurs in an on-vehicle device. The failures to be displayed include a failure significantly influencing traveling and a failure less influencing traveling as described above. ECU 100 controls whether to display an alarm or not when a failure occurs in the on-vehicle device.

ECU 100 is configured to include a central processing unit (CPU) 101, a memory (read only memory (ROM) and a random access memory (RAM)) 102, and an input/output buffer 103. CPU 101 develops the program, which is stored in the ROM, on the RAM or the like for execution. The program stored in the ROM includes a description of a process to be performed by ECU 100.

As main control executed by ECU 100 in the present embodiment, ECU 100 controls displaying of an alarm on instrument panel 60. In this case, depending on whether the person who performs maintenance of vehicle 10 is a driver or not, ECU 100 displays different alarms on instrument panel 60 when a failure occurs in the on-vehicle device.

The driver normally performs maintenance of the vehicle, but the driver may not be a person who performs maintenance. For example, when the vehicle is used for car sharing, maintenance of the vehicle may be performed not by a driver but by a car sharing operator. Furthermore, in the case of a vehicle for driverless driving (automated driving), maintenance of such a vehicle may be performed by a vehicle dealer and the like. In the case where the person who performs maintenance of the vehicle is not a driver as described above, when a vehicle user is notified of an alarm about a failure each time such a failure occurs in the on-vehicle device, the user may feel annoyance with the alarm.

Thus, in vehicle 10 according to the present embodiment, in the case where the person who performs maintenance is not a driver (but is a dealer of vehicle 10, and the like, for example), ECU 100 controls instrument panel 60 not to issue a notification of an alarm about a failure less influencing traveling. Thereby, in the case where the person who performs maintenance is not a driver, the annoyance can be reduced that the driver feels due to a notification of an alarm about a failure less influencing traveling.

In the case where the person who performs maintenance is a driver, ECU 100 controls instrument panel 60 to issue a notification of an alarm upon occurrence of a failure irrespective of the type of this failure. In the present embodiment, even in the case where the person who performs maintenance is not a driver, ECU 100 controls instrument panel 60 to issue a notification of an alarm when a failure significantly influencing traveling occurs. Thereby, when a failure significantly influencing traveling occurs, the driver can take appropriate measures, for example, by contacting a dealer. The details of the process executed by ECU 100 will be described later in detail.

Also in the present embodiment, vehicle 10 is configured to be capable of performing driverless driving (automated driving) and also capable of selecting whether to perform driverless driving or not. In this example, the occupant in vehicle 10 can select driverless driving through navigation device 70. When driverless driving is selected, ECU 100 controls PCU 30 and a steering device (not shown), thereby executing various controls for implementing driverless driving.

Driverless driving means that the driving operations such as acceleration, deceleration and steering of vehicle 10 are automatically performed not by the driving operation performed by a vehicle occupant. In driverless driving, the vehicle occupant is not responsible for controlling the driving operation of vehicle 10. Also, driverless driving does not relate to whether a vehicle occupant sits in a driver's seat or not. When an abnormality that disables driverless driving occurs, driverless driving may be able to be cancelled (that is, the vehicle occupant in the driver's seat is designated as a driver).

In order to allow driverless driving of vehicle 10, ECU 100 includes sensor group 80 for detecting the conditions on the outside and the inside of vehicle 10. Sensor group 80 includes: various types of external sensors each configured to detect the condition on the outside of vehicle 10; and various types of internal sensors each configured to detect the information corresponding to the traveling state of vehicle 10, the steering operation, the accelerator operation, and the brake operation.

The external sensors include, for example, a camera for vehicle outside image, a radar, a laser imaging detection and ranging (LIDAR), and the like (each of which is not shown). The camera for vehicle outside image captures an image of the scene outside vehicle 10, and outputs the captured image information about the scene outside vehicle 10 to ECU 100. The radar transmits radio waves (for example, millimeter waves) to the surrounding area of vehicle 10 and receives the radio waves reflected by an obstacle to thereby detect the obstacle. Then, the radar outputs, to ECU 100, the distance to the obstacle and the direction to the obstacle as obstacle information about the obstacle. The LIDAR transmits light (typically, ultraviolet rays, visible rays, or near-infrared rays) to the surrounding area of vehicle 10, and receives the light reflected by the obstacle, to thereby measure the distance to the reflecting point so as to detect the obstacle. To ECU 100, the LIDAR outputs the distance to the obstacle and the direction to the obstacle, for example, as obstacle information.

The internal sensors, for example, include a vehicle speed sensor, an acceleration sensor, and a yaw rate sensor and the like (each of which is not shown). The vehicle speed sensor is provided in driving wheel 23 or a drive shaft, and the like. The vehicle speed sensor detects the rotation speed and outputs the vehicle speed information including the speed of vehicle 10 to ECU 100. The acceleration sensor includes, for example, a forward/backward acceleration sensor for detecting the acceleration of vehicle 10 in the forward and backward directions, and a lateral acceleration sensor for detecting the lateral acceleration of vehicle 10. The acceleration sensors output acceleration information including both of these accelerations to ECU 100. The yaw rate sensor detects a yaw rate (the rotation angle speed) around the vertical axis of the center of gravity of vehicle 10. The yaw rate sensor is a gyro sensor, for example, and outputs the yaw rate information including the yaw rate of vehicle 10 to ECU 100.

The internal sensors further include various types of other sensors for monitoring the state of vehicle 10 and, for example, include a temperature sensor and the like for detecting the temperatures (coil temperatures) of first MG 11 and second MG 12. The above-mentioned temperature sensors detect the temperatures of first MG 11 and second MG 12, and then output the detected values to ECU 100.

Navigation device 70 includes a GPS receiver (not shown) that specifies the position of vehicle 10 based on the radio waves from a satellite. Navigation device 70 performs various types of navigation processes for vehicle 10 using the location information (GPS information) of vehicle 10 that is specified by the GPS receiver. Specifically, based on the GPS information of vehicle 10 and the road map data stored in the memory (not shown), navigation device 70 calculates the traveling route (an expected traveling route or a target route) from the current location of vehicle 10 to its destination, and outputs the information about the target route to ECU 100.

Furthermore, navigation device 70 also functions as a human machine interface (HMI) device that provides various pieces of information to the user of vehicle 10 and receives various types of setting inputs entered by the user. Thus, navigation device 70 further includes an input port 71 through which various pieces of information is received, and a display 72 with a touch panel on which the user operation is accepted and various pieces of information is displayed.

Navigation device 70 as an HMI device is configured, for example, such that the vehicle occupant in vehicle 10 can select whether to perform the above-mentioned driverless driving or not. Furthermore, navigation device 70 is configured such that the user of vehicle 10 can perform setting such that the person who performs maintenance of vehicle 10 is a driver or a person other than the driver (for example, a dealer of vehicle 10, and the like). The information set in navigation device 70 is output from navigation device 70 to ECU 100.

Verification ECU 110 conducts wireless communication with the electronic key possessed by the user of vehicle 10, thereby verifying whether the user can use vehicle 10 or not. For example, when verification ECU 110 detects the user's door unlock operation, it verifies the ID of the electronic key with Which this verification ECU 110 can communicate. If the ID verification succeeds, unlocking of the door is permitted.

In the present embodiment, vehicle 10 is configured to be usable for car sharing. In order to allow vehicle 10 to be used for car sharing, in the present embodiment, a common key used when vehicle 10 is used for car sharing is provided separately from an individual key used when the owner of vehicle 10 uses vehicle 10 for individual use. Also, verification ECU 110 is configured to allow distinction between the individual key and the common key. Thus, when the ID verification for the common key succeeds, verification ECU 110 determines that vehicle 10 is used for car sharing.

Communication device 90 is configured to be capable of communicating with devices outside vehicle 10. For example, communication device 90 is configured to be capable of communicating through the Internet and the like with a dealer terminal 210 provided in a dealer, a repair plant and the like in which maintenance of vehicle 10 can be performed. Furthermore, communication device 90 is configured to be capable of communicating, in a wired or wireless manner, with a service tool 220 used for maintenance of vehicle 10 in the dealer, the repair plant and the like. Furthermore, communication device 90 is configured to be capable of communicating through the Internet or a telephone line with a smartphone 230 possessed by the user of vehicle 10.

Figure 2:
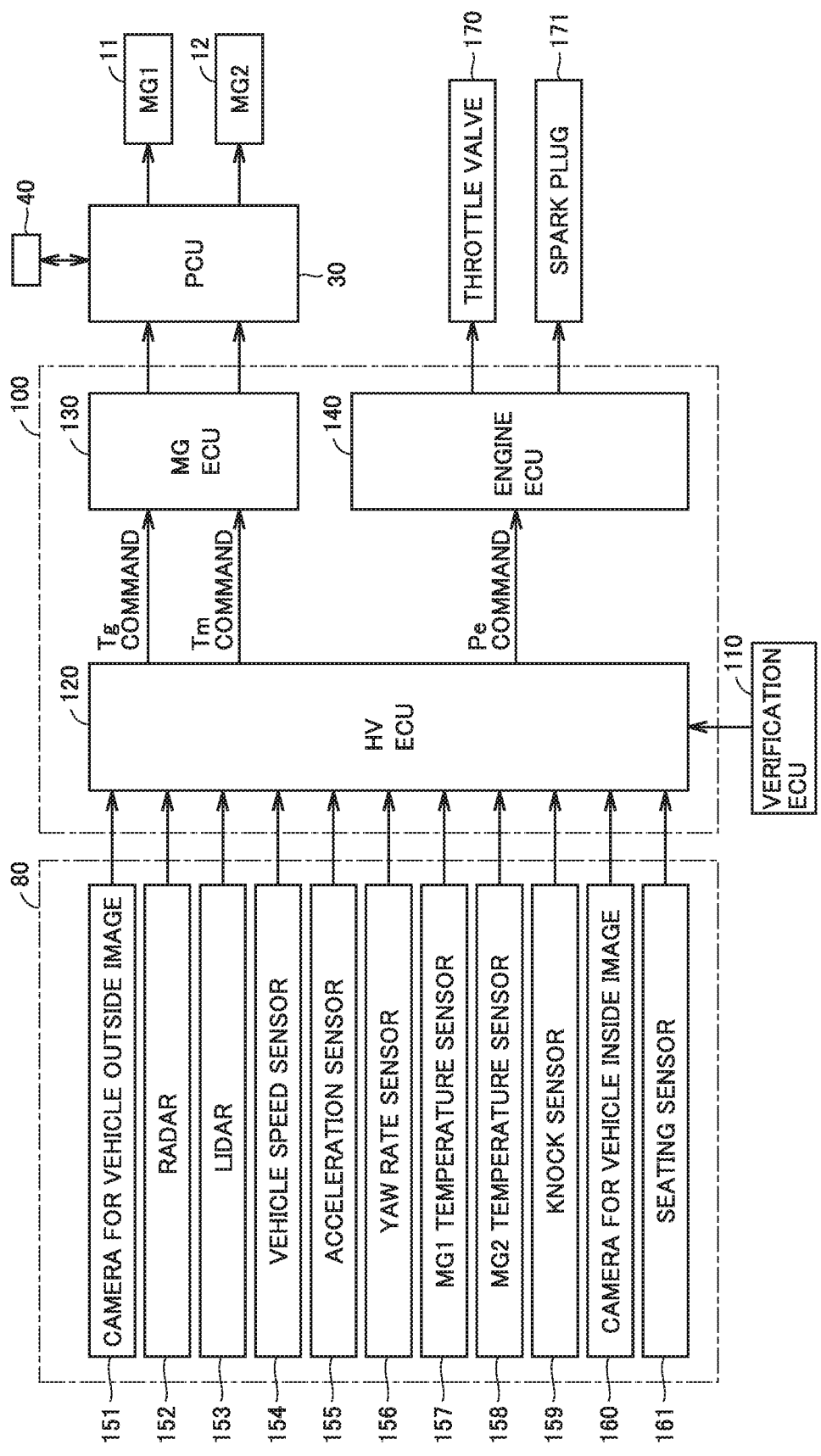
FIG. 2 is a diagram showing a configuration example of a control system in a vehicle shown in FIG. 1.

FIG. 2 is a diagram showing a configuration example of a control system in vehicle 10 shown in FIG. 1. Referring to FIG. 2, ECU 100 is configured to include an HV-ECU 120, an MG-ECU 130, and an engine ECU 140. HV-ECU 120 receives various detection signals from sensor group 80. Specifically, a camera 151 for vehicle outside image, a radar 152, a LIDAR 153, a vehicle speed sensor 154, an acceleration sensor 155, a yaw rate sensor 156, an MG1 temperature sensor 157, an MG2 temperature sensor 158, a knock sensor 159, a camera 160 for vehicle inside image, a seating sensor 161, and the like are connected to HV-ECU 120.

Since camera 151 camera for vehicle outside image, radar 152, and LIDAR 153 have been described with reference to FIG. 1 as illustrative examples of the external sensors included in sensor group 80, the description thereof will not be repeated. Furthermore, since vehicle speed sensor 154, acceleration sensor 155, yaw rate sensor 156, MG1 temperature sensor 157, and MG2 temperature sensor 158 have also been described with reference to FIG. 1 as illustrative examples of the internal sensors included in sensor group 80, the description thereof will not be repeated.

Knock sensor 159 detects occurrence of knocking in engine 21 (vibrations of the engine main body), and outputs the signal showing the detection result to HV-ECU 120. By providing knock sensor 159, control of engine 21 is appropriately adjusted when knocking occurs, thereby improving the noise vibration (NV) characteristics of vehicle 10.

Camera 160 for vehicle inside image captures an image on the inside of the vehicle cabin of vehicle 10, and outputs the information of the captured images related to the inside of the vehicle cabin to HV-ECU 120. As described above, driverless driving can be selected through navigation device 70 by a vehicle occupant. However, driverless driving may be selected when, based on the information of the images captured by camera 160 for vehicle inside image, HV-ECU 120 determines that no vehicle occupant sits in the driver's seat.

Seating sensor 161 is provided in each seat of vehicle 10. Seating sensor 161 detects whether the vehicle occupant sits or not in each seat, and outputs the signal showing the detection result to HV-ECU 120. Also in the case of this seating sensor 161, driverless driving may be selected when HV-ECU 120 determines based on the detection signal of seating sensor 161 that no vehicle occupant sits in the driver's seat.

HV-ECU 120 performs various processes for cooperatively controlling engine 21, first MG 11, and second MG 12. Vehicle 10 can travel while switching the traveling mode between HV (hybrid vehicle) traveling and EV (electric vehicle) traveling as appropriate. In ITV traveling, vehicle 10 travels by engine 21 and second MG 12 while engine 21 is kept operated. In EV traveling, vehicle 10 travels by second MG 12 while engine 21 is kept stopped. In addition, EV traveling is selected in a low-load driving region in which the vehicle speed is low and the required driving force is small. In EV traveling, the output torque from second MG 12 is used as a driving source for traveling in the state where engine 21 is stopped. HV traveling is selected in a high-load driving region in which the vehicle speed is high and the required driving force is large. In HV traveling, the torque obtained by combining the output torque from engine 21 and the output torque from second MG 12 is used as a driving source for traveling.

HV-ECU 120 determines the required driving force in accordance with the accelerator pedal position, the vehicle speed and the like that are determined by the accelerator pedal operation amount. Based on the required driving force, HV-ECU 120 calculates the required power for engine 21. HV-ECU 120 controls vehicle 10 while switching the traveling mode so as to achieve the optimum system efficiency relative to the required power. Furthermore, based on the required power for engine 21, HV-ECU 120 determines the engine operating point (rotation speed and torque), for example, at which the fuel consumption of engine 21 is minimized.

The torque and the rotation speed of first MG 11 are controlled such that engine 21 operates at the above-mentioned operating point. HV-ECU 120 controls engine 21, first MG 11 and second MG 12 such that the required driving force determined in accordance with the accelerator pedal position, the vehicle speed and the like is output to driving wheel 23 during HV traveling.

To MG-ECU 130, HV-ECU 120 outputs: a command (a Tg command) for instructing first MG 11 to generate a torque Tg; and a command (a Tm command) for instructing second MG 12 to generate a torque Tm. Furthermore, HV-ECU 120 outputs a command (a Pe command) to engine ECU 140 for instructing engine 21 to generate power Pe.

Based on the command received from HV-ECU 120, MG-ECU 130 generates signals for driving first MG 11 and second MG 12, and outputs the signals to PCU 30. Based on the Pe command received from HV-ECU 120, engine ECU 140 performs various controls for respective components in engine 21, such as a throttle valve 170, a spark plug 171.

Furthermore, HV-ECU 120 receives the result of ID verification obtained in verification ECU 110. Specifically, from verification ECU 110, HV-ECU 120 receives a signal showing whether ID verification has been performed for the individual key used for vehicle 10 used as an individual use (individual key authentication) or ID verification has been performed for the common key used for vehicle 10 used for car sharing (common key authentication).

Figure 3:
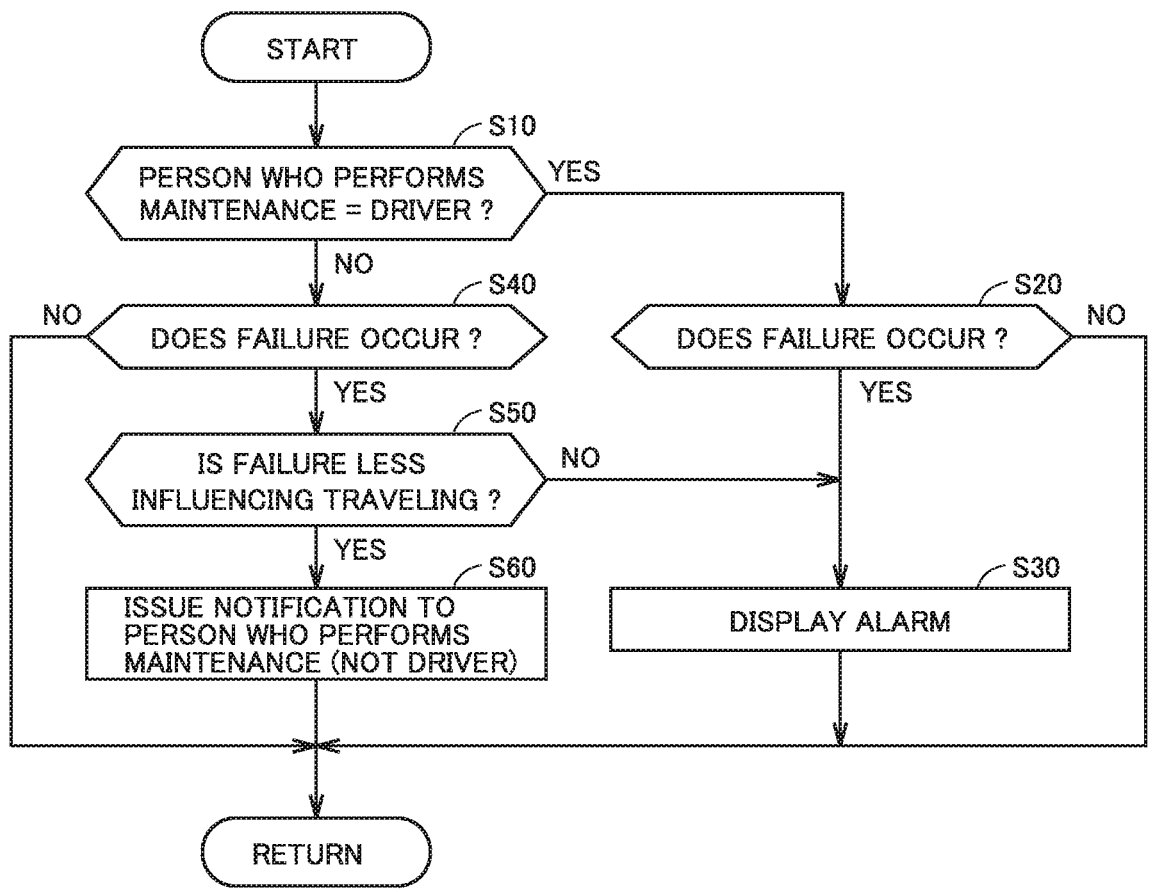
FIG. 3 is a flowchart illustrating an example of the process for an alarm notification executed by an electronic control unit (ECU).

FIG. 3 is a flowchart illustrating an example of the process for an alarm notification executed by ECU 100. A series of processes illustrated in this flowchart is repeatedly performed in each prescribed period while the system of vehicle 10 is started (in the Ready-ON state).

Referring to FIG. 3, ECU 100 determines whether the person who performs maintenance of vehicle 10 is a driver or not (step S10). Based on the setting in navigation device 70, it can be determined whether the person who performs maintenance of vehicle 10 is a driver or not. In addition, dealer terminal 210, service tool 220 or smartphone 230 may be able to set whether the person who performs maintenance is a driver or not. Also, based on the setting obtained from dealer terminal 210, service tool 220 or smartphone 230 through communication device 90, it may be determined whether the person who performs maintenance is a driver or not.

When it is determined in step S1.0 that the person who performs maintenance of vehicle 10 is a driver (YES in step S10), ECU 100 determines whether a failure occurs or not in the on-vehicle device (step S20). The failures to be determined include: a failure significantly influencing traveling; and a failure less influencing traveling. For example, failures significantly influencing traveling include: an abnormality in the engine spark plug; an overcurrent abnormality in first MG 11 or second MG 12; a short circuit fault in the cell inside power storage device 40; insulation resistance reduction in a plurality of high voltage electrical systems; and the like. For example, failures less influencing traveling include: insulation resistance reduction in interlock system 50, air-bag system 52, cooling system 54, or one of high voltage electrical systems; a failure in MG1 temperature sensor 157, MG2 temperature sensor 158 or knock sensor 159; and the like.

When a failure occurs in cooling system 54, a water pump cannot be variably controlled in two stages of high driving and low driving based on the temperature of PCU 30 even though vehicle 10 still can travel. Thus, the power consumption cannot be appropriately adjusted, so that the fuel efficiency deteriorates. In other words, a failure in cooling system 54 corresponds to a failure that deteriorates the fuel efficiency while vehicle 10 can travel.

Furthermore, when a failure occurs in knock sensor 159, occurrence of knocking cannot be detected even though vehicle 10 can travel. Accordingly, when knocking occurs, control of engine 21 cannot be appropriately adjusted, so that the NV characteristics of vehicle 10 deteriorate. In other words, a failure in knock sensor 159 corresponds to a failure that deteriorates the NV characteristics of vehicle 10 while vehicle 10 can travel.

When it is determined in step S20 that a failure occurs (YES in step S20), ECU 100 controls instrument panel 60 to display an alarm about this failure irrespective of whether the occurred failure is a failure significantly influencing traveling or a failure less influencing traveling (step S30). When it is determined in step S20 that a failure does not occur (NO in step S20), the process proceeds to "RETURN" without performing the process in step S30.

Also when it is determined in step S10 that the person who performs maintenance of vehicle 10 is not a driver (but a dealer, a repairer, or the like) (NO in step S10), ECU 100 determines whether a failure occurs or not in the on-vehicle device (step S40). The failures to be determined are the same as those in step S20.

When it is determined in step S40 that a failure occurs (YES in step S40), ECU 100 determines whether or not the occurred failure is a failure less influencing traveling (step S50). The failure less influencing traveling is as described in step S20.

Then, when it is determined that the occurred failure is a failure less influencing traveling (YES in step S50), ECU 100 notifies the person who performs maintenance (who is not a driver) about the failure through communication device 90 (step S60). The notification target is, for example, dealer terminal 210 provided in a dealer, a repair plant or the like that is capable of performing maintenance of vehicle 10.

When it is determined in step S50 that the occurred failure is a failure significantly influencing traveling (NO in step S50), ECU 100 proceeds the process to step S30 and controls instrument panel 60 to display an alarm about the occurred failure. Thereby, the driver can take appropriate measures, for example, by contacting a dealer. The failure significantly influencing traveling is as described in step S20.

When it is determined in step S40 that no failure occurs (NO in step S40), the process proceeds to "RETURN" without performing the processes in and after step S50.

As described above, according to the present embodiment, when the driver is not to perform maintenance, instrument panel 60 does not display an alarm about the failure less influencing traveling. Therefore, the annoyance can be reduced that the driver feels when such an alarm is displayed on instrument panel 60.

Furthermore, according to the present embodiment, even in the case where the driver is not to perform maintenance, instrument panel 60 displays an alarm upon occurrence of a failure significantly influencing traveling. Accordingly, when a failure significantly influencing traveling occurs, the driver can take appropriate measures, for example, by contacting a dealer.

Furthermore, in the present embodiment, when a failure less influencing traveling occurs in the case where the driver is not to perform maintenance, communication device 90 transmits a notification about the failure to the person who performs maintenance (a dealer, a repairer, and the like). Thereby, the person who performs maintenance and who is not in vehicle 10 can recognize occurrence of the failure, and therefore, can take appropriate measures.

It is not indispensable in the above-described embodiment that driverless driving can be performed and that vehicle 10 can be used for car sharing. Also, the first modification described below relates to an alarm notification issued in the case where driverless driving is performed. The second modification described below relates to an alarm notification issued in the case where vehicle 10 is used for car sharing.

[First Modification]

In the first modification, based on whether driverless driving is being performed or not, it is determined whether the person who performs maintenance of vehicle 10 is a driver or not. Specifically, when driverless driving is not being performed, it is determined that the person who performs maintenance of vehicle 10 is a driver. Furthermore, when driverless driving is being performed, it is determined that the person who performs maintenance of vehicle 10 is not a driver.

FIG. 4 is a flowchart illustrating an example of the process for an alarm notification executed by ECU 100 in the first modification. A series of processes illustrated in this flowchart is also repeatedly performed in each prescribed period while the system of vehicle 10 is started (in the Ready-ON state).

Referring to FIG. 4, ECU 100 determines whether a driverless driving mode is selected or not (step S110). Based on the setting in navigation device 70, it can be determined whether the driverless driving mode is selected or not. Also, based on the information of the image captured by camera 160 for vehicle inside image or the detection signal of seating sensor 161, it is determined whether a vehicle occupant sits in the driver's seat or not. When no vehicle occupant sits in the driver's seat, it may be automatically determined that the driverless driving mode is selected.

When it is determined in step S110 that the driverless driving mode is not selected (NO in step S110), ECU 100 performs setting such that the person who performs maintenance of vehicle 10 is a driver (step S115). Then, ECU 100 determines whether a failure occurs or not in the on-vehicle device (step S120). The processes in steps S120 and S125 are the same as those in steps S20 and S30 in FIG. 3.

When it is determined in step S110 that the driverless driving mode is selected (YES in step S110), ECU 100 performs setting such that the person who performs maintenance of vehicle 10 is not a driver (but a dealer, a repairer, and the like) (step S130). Then, ECU 100 determines whether a failure occurs or not in the on-vehicle device (step S135). The failures to be determined are the same as those in step S120.

When it is determined in step S135 that a failure occurs (YES in step S135), ECU 100 determines whether a vehicle occupant is absent or not in a vehicle cabin (step S140). Based on the information of the image captured by camera 160 for vehicle inside image or the detection signal of seating sensor 161, it can be determined whether a vehicle occupant is in a vehicle cabin or not.

When a vehicle occupant is in the vehicle cabin (NO in step S140), ECU 100 determines whether the occurred failure is a failure less influencing traveling or not (step S145). The failure less influencing traveling is as described in step S20 in FIG. 3.

Then, when it is determined that the occurred failure is a failure less influencing traveling (YES in step S145), ECU 100 issues a notification to the person who performs maintenance (who is not a driver) through communication device 90 (step S150). The notification target is, for example, dealer terminal 210 as described above.

When it is determined in step S145 that the occurred failure is a failure significantly influencing traveling (NO in step S145), ECU 100 proceeds the process to step S125, and controls instrument panel 60 to display an alarm about the occurred failure. In this case, not only an alarm may be displayed on instrument panel 60, but also a warning sound may be generated inside the vehicle. Thereby, the vehicle occupant can recognize that the failure has caused a change in the operation behavior of vehicle 10, and also can recognize the detailed type of failure by looking at instrument panel 60.

On the other hand, when it is determined in step S140 that the vehicle occupant is absent in the vehicle cabin (YES in step S140), ECU 100 proceeds the process to step S150 without performing the process in step S145. Thus, when the vehicle occupant is absent in the vehicle cabin, no alarm is issued even though the occurred failure is a failure significantly influencing traveling. This is for the purpose of preventing an unnecessary alarm notification inside the vehicle since the vehicle occupant is absent in the vehicle cabin.

When it is determined in step S135 that no failure occurs (NO in step S135), the process proceeds to "RETURN" without performing the processes in and after step S145.

The present first modification can reduce the annoyance that, despite during driverless driving, instrument panel 60 displays an alarm about a failure less influencing traveling.

According to the present first modification, when the vehicle occupant is absent in the vehicle cabin during driverless driving, instrument panel 60 does not display an alarm about a failure significantly influencing traveling. Thus, instrument panel 60 does not unnecessarily display an alarm when the vehicle occupant is absent in the vehicle cabin.

[Second Modification]

In the present second modification, based on whether vehicle 10 is used for car sharing or not, it is determined whether the person who performs maintenance of vehicle 10 is a driver or not. Specifically, when vehicle 10 is used for individual use, it is determined that the person who performs maintenance of vehicle 10 is a driver. When vehicle 10 is used for car sharing, it is determined that the person who performs maintenance of vehicle 10 is not a driver.

FIG. 5 is a flowchart illustrating an example of the process for an alarm notification executed by ECU 100 in the second modification. A series of processes illustrated in this flowchart is also repeatedly performed in each prescribed period while the system of vehicle 10 is started (in the Ready-ON state).

Referring to FIG. 5, ECU 100 determines whether vehicle 10 is used for car sharing or not (step S210). Based on the key verification by verification ECU 110, it can be determined whether vehicle 10 is used for car sharing or not. Specifically, when a common key verification succeeds, it is determined that vehicle 10 is used for car sharing. When an individual key verification succeeds, it is determined that vehicle 10 is normally used (for individual use).

Then, when it is determined in step S210 that vehicle 10 is not used for car sharing (NO in step S210), ECU 100 proceeds the process to step S215, and performs setting such that the person who performs maintenance of vehicle 10 is a driver. Since the processes in steps S215, S220 and S225 are the same as those in steps S115, S120 and S125, respectively, shown in FIG. 4, the description thereof will not be repeated.

On the other hand, when it is determined in step S210 that vehicle 10 is used for car sharing (YES in step S210), ECU 100 performs setting such that the person who performs maintenance of vehicle 10 is not a driver (but a dealer, a repairer, and the like) (step S230). Then, ECU 100 proceeds the process to step S235 and determines whether a failure occurs or not in the on-vehicle device. Since the processes in steps S235, S240 and S245 are the same as those in steps S40, S50 and S60, respectively, shown in FIG. 3, the description thereof will not be repeated.

The present second modification can reduce the annoyance that instrument panel 60 displays an alarm about a failure less influencing traveling when vehicle 10 is used for car sharing.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
  a notification device that notifies a driver about an alarm; and
  a controller that controls the notification device based on a setting as to whether the driver is to perform maintenance of the vehicle or not, wherein:
  in a first setting in which the driver is to perform the maintenance, the controller controls the notification device to issue a notification of an alarm when a failure occurs in an on-vehicle device,
  the controller determines whether the failure in the on-vehicle device is a first failure significantly influencing traveling of the vehicle or a second failure less influencing traveling of the vehicle than the first failure,
  in a second setting in which the driver is not to perform the maintenance, the controller controls the notification device not to issue a notification of an alarm about the second failure,
  the vehicle is capable of performing driverless driving,
  the controller selects the second setting as the setting during the driverless driving,
  the controller controls the notification device not to issue a notification of an alarm about the first failure when a vehicle occupant is not in the vehicle during the driverless driving, and
  the controller controls the notification device to issue a notification of an alarm about the second failure to a person who performs maintenance when a vehicle occupant is not in the vehicle during the driverless driving.

2. The vehicle according to claim 1, wherein, in the second setting, the controller controls the notification device to issue a notification of an alarm when the first failure occurs.

3. The vehicle according to claim 1, further comprising an input device that is capable of setting whether the driver is to perform the maintenance or not.

4. The vehicle according to claim 1, wherein the controller obtains the setting from outside the vehicle.

5. The vehicle according to claim 1, wherein the controller selects the second setting as the setting when the vehicle is used for car sharing.

6. The vehicle according to claim 1, further comprising a communication device that communicates with outside the vehicle, wherein
  the communication device transmits a notification to the person who performs the maintenance when the setting is the second setting and when the second failure occurs.

7. The vehicle according to claim 1, wherein the second failure includes a failure that deteriorates fuel efficiency while the vehicle is capable of traveling.

8. The vehicle according to claim 1, wherein the second failure includes a failure that deteriorates NV characteristics of the vehicle while the vehicle is capable of traveling.

9. The vehicle according to claim 1, wherein the second failure includes a failure in an interlock system.

10. The vehicle according to claim 1, further comprising:
a motor mounted as a power source of the vehicle; and
a sensor that detects a temperature of the motor, wherein the second failure includes a failure in the sensor.

11. The vehicle according to claim 1, wherein the second failure includes a failure showing a reduction in an insulation resistance in one of electrical systems of the vehicle.

12. The vehicle according to claim 1, wherein the second failure includes a failure in an air-bag system.

* * * * *